(12) United States Patent
Barhorst et al.

(10) Patent No.: US 11,426,825 B2
(45) Date of Patent: Aug. 30, 2022

(54) SYSTEMS AND METHODS FOR WELDING MILL SCALED WORKPIECES

(71) Applicant: HOBART BROTHERS LLC, Troy, OH (US)

(72) Inventors: Steven Edward Barhorst, Sidney, OH (US); Daryl L. Duncan, Troy, OH (US); Joseph C. Bundy, Piqua, OH (US); Zhigang Xiao, Washington Township, OH (US)

(73) Assignee: HOBART BROTHERS LLC, Troy, OH (US)

( * ) Notice: Subject to any disclaimer, the term of this patent is extended or adjusted under 35 U.S.C. 154(b) by 365 days.

(21) Appl. No.: 16/424,113

(22) Filed: May 28, 2019

(65) Prior Publication Data

US 2019/0381611 A1 Dec. 19, 2019

Related U.S. Application Data

(63) Continuation of application No. 14/879,578, filed on Oct. 9, 2015, now Pat. No. 10,300,565.
(Continued)

(51) Int. Cl.
*B23K 35/36* (2006.01)
*B23K 9/173* (2006.01)
(Continued)

(52) U.S. Cl.
CPC .............. *B23K 35/36* (2013.01); *B23K 9/173* (2013.01); *B23K 9/327* (2013.01);
(Continued)

(58) Field of Classification Search
None
See application file for complete search history.

(56) References Cited

U.S. PATENT DOCUMENTS

| | | | |
|---|---|---|---|
| 1,763,417 A | 6/1930 | Edward | |
| 2,053,956 A | 9/1936 | Humberstone | |

(Continued)

FOREIGN PATENT DOCUMENTS

| | | |
|---|---|---|
| AT | 274513 | 10/2006 |
| AU | 2009202190 | 1/2010 |

(Continued)

OTHER PUBLICATIONS

Anonymous; "Sodium Carbonate," Wikipedia, The Free Encyclodedia, http://en.wikipedia.org/wiki/Sodium_carbonate [retrieved on Aug. 5, 2015].

(Continued)

*Primary Examiner* — Brian W Jennison
(74) *Attorney, Agent, or Firm* — McAndrews Held & Malloy, Ltd.

(57) ABSTRACT

This disclosure relates generally to Gas Metal Arc Welding (GMAW) and, more specifically, to Metal-cored Arc Welding (MCAW) of mill scaled steel workpieces. A metal-cored welding wire, including a sheath and a core, capable of welding mill scaled workpieces without prior descaling is disclosed. The metal-cored welding wire has a sulfur source that occupies between approximately 0.04% and approximately 0.18% of the weight of the metal-cored welding wire, and has a cellulose source that occupies between approximately 0.09% and approximately 0.54% of the weight of the metal-cored welding wire.

24 Claims, 3 Drawing Sheets

Related U.S. Application Data (60) Provisional application No. 62/065,371, filed on Oct. 17, 2014.

(51) Int. Cl.
  *B23K 35/30* (2006.01)
  *B23K 35/368* (2006.01)
  *B23K 35/40* (2006.01)
  *B23K 35/02* (2006.01)
  *B23K 9/32* (2006.01)
  *B23K 103/04* (2006.01)

(52) U.S. Cl.
  CPC ...... *B23K 35/0255* (2013.01); *B23K 35/0261* (2013.01); *B23K 35/0266* (2013.01); *B23K 35/3053* (2013.01); *B23K 35/3086* (2013.01); *B23K 35/368* (2013.01); *B23K 35/3612* (2013.01); *B23K 35/404* (2013.01); *B23K 35/406* (2013.01); *B23K 2103/04* (2018.08)

(56) References Cited

U.S. PATENT DOCUMENTS

| | | | |
|---|---|---|---|
| 2,613,304 | A | 10/1952 | Colinet |
| 2,870,047 | A | 1/1959 | Kee |
| 2,895,854 | A | 7/1959 | Rocque |
| 2,900,490 | A | 8/1959 | Petryck |
| 3,036,205 | A | 5/1962 | Masao |
| 3,107,176 | A | 10/1963 | Witherell |
| 3,124,479 | A | 3/1964 | Witherell |
| 3,167,450 | A | 1/1965 | Masao |
| 3,318,729 | A | 5/1967 | Siegle |
| 3,342,972 | A | 9/1967 | Penberg |
| 3,345,495 | A | 10/1967 | Quaas |
| 3,452,419 | A | 7/1969 | Hillert |
| 3,453,142 | A * | 7/1969 | Dorschu .............. B23K 35/365 428/389 |
| 3,491,225 | A | 1/1970 | Oku |
| 3,501,354 | A | 3/1970 | Delong |
| 3,519,783 | A | 7/1970 | Forsberg |
| 3,533,152 | A | 10/1970 | Gloor |
| 3,542,998 | A | 11/1970 | Huff |
| 3,554,792 | A * | 1/1971 | Johnson ............. B23K 35/3608 219/146.52 |
| 3,555,240 | A | 1/1971 | Gloor |
| 3,558,851 | A | 1/1971 | Oku |
| 3,559,864 | A | 2/1971 | Hillert |
| 3,560,702 | A | 2/1971 | Arikawa |
| 3,580,748 | A | 5/1971 | Delong |
| 3,620,830 | A | 11/1971 | Kramer |
| 3,625,757 | A | 12/1971 | Mott |
| 3,627,574 | A | 12/1971 | Delong |
| 3,643,061 | A | 2/1972 | Duttera |
| 3,768,996 | A | 10/1973 | Metz |
| 3,769,099 | A * | 10/1973 | DeLong ............... B23K 35/362 148/26 |
| 3,778,588 | A | 12/1973 | Bishel |
| 3,783,234 | A | 1/1974 | Russell |
| 3,805,016 | A | 4/1974 | Soejima |
| 3,818,178 | A | 6/1974 | Nakabayashi |
| 3,851,143 | A | 11/1974 | Bishel |
| 3,860,777 | A | 1/1975 | Sawhill, Jr. |
| 3,885,120 | A | 5/1975 | Ropitzky |
| 3,909,253 | A | 9/1975 | Asnis |
| 3,935,414 | A | 1/1976 | Ballass |
| 3,947,655 | A | 3/1976 | Gonzalez |
| 3,999,036 | A | 12/1976 | Muratov |
| 4,122,238 | A | 10/1978 | Frantzerbsr |
| 4,131,784 | A | 12/1978 | Kimura |
| 4,189,539 | A | 2/1980 | Ward |
| 4,245,145 | A | 1/1981 | Maniar |
| 4,296,921 | A | 10/1981 | Hayashi |
| 4,343,984 | A | 8/1982 | Smith |
| 4,355,054 | A | 10/1982 | Nagano |
| 4,367,394 | A | 1/1983 | Sakai |
| 4,503,129 | A | 3/1985 | Okuda |
| 4,551,610 | A | 11/1985 | Amata |
| 4,593,174 | A | 6/1986 | Saito |
| 4,662,952 | A | 5/1987 | Barringer |
| 4,689,461 | A | 8/1987 | Gamberg |
| 4,721,837 | A | 1/1988 | Gamberg |
| 4,738,389 | A | 4/1988 | Moshier |
| 4,790,887 | A | 12/1988 | Niinivaara |
| 4,843,212 | A | 6/1989 | Shneerov |
| 4,861,392 | A | 8/1989 | Grabe |
| 4,920,254 | A | 4/1990 | Decamp |
| 4,940,882 | A | 7/1990 | Bates |
| 4,999,479 | A | 3/1991 | Paton |
| 5,055,655 | A | 10/1991 | Chai |
| 5,091,628 | A | 2/1992 | Chai |
| 5,218,757 | A | 6/1993 | Kaneko |
| 5,294,485 | A | 3/1994 | Takao |
| 5,300,754 | A | 4/1994 | Gonzalez |
| 5,330,850 | A | 7/1994 | Suzuki |
| 5,332,628 | A | 7/1994 | Drossman |
| 5,369,244 | A | 11/1994 | Kulikowski |
| 5,473,139 | A | 12/1995 | Matsui |
| 5,580,475 | A | 12/1996 | Sakai |
| 5,708,253 | A | 1/1998 | Bloch |
| 5,744,782 | A | 4/1998 | Sampath |
| 5,780,809 | A | 7/1998 | Landrio |
| 5,857,141 | A | 1/1999 | Keegan |
| 5,898,022 | A | 4/1999 | Maples |
| 6,339,209 | B1 | 1/2002 | Kotecki |
| 6,410,885 | B1 | 6/2002 | Correia |
| 6,426,483 | B1 | 7/2002 | Blankenship |
| 6,476,356 | B2 | 11/2002 | Kim |
| 6,582,835 | B2 | 6/2003 | Antoni |
| 6,608,284 | B1 * | 8/2003 | Nikodym ........... B23K 35/3053 219/137 WM |
| 6,723,954 | B2 | 4/2004 | Nikodym |
| 6,940,042 | B2 | 9/2005 | Hara |
| 7,087,859 | B2 | 8/2006 | Burt |
| 7,087,860 | B2 | 8/2006 | Nikodym |
| 7,241,970 | B2 | 7/2007 | Fortain |
| 7,521,081 | B2 | 4/2009 | Butler |
| 7,718,014 | B2 | 5/2010 | Usami |
| 7,781,701 | B2 | 8/2010 | Burt |
| 7,807,948 | B2 | 10/2010 | Katiyar |
| 7,812,284 | B2 | 10/2010 | Narayanan |
| 8,258,432 | B2 | 9/2012 | Narayanan |
| 8,337,643 | B2 | 12/2012 | Sun |
| 8,748,778 | B2 | 6/2014 | Kodama |
| 8,758,901 | B2 | 6/2014 | Nakamura et al. |
| 8,907,248 | B2 | 12/2014 | Amata |
| 9,180,553 | B2 | 11/2015 | Quintana |
| 9,199,341 | B2 | 12/2015 | Barhorst |
| 2002/0008096 | A1 | 1/2002 | Kim |
| 2002/0153364 | A1 | 10/2002 | North |
| 2003/0019856 | A1 | 1/2003 | Correia |
| 2003/0136765 | A1 | 7/2003 | Miklos |
| 2003/0136774 | A1 | 7/2003 | Nikodym |
| 2003/0178402 | A1 | 9/2003 | Nikodym |
| 2003/0222059 | A1 | 12/2003 | De Kock |
| 2004/0020912 | A1 | 2/2004 | Hara |
| 2004/0084421 | A1 | 5/2004 | Bolton |
| 2004/0187961 | A1 | 9/2004 | Crockett |
| 2005/0040143 | A1 | 2/2005 | Neff |
| 2005/0121110 | A1 | 6/2005 | Dallam |
| 2005/0205525 | A1 | 9/2005 | Barhorst |
| 2005/0224481 | A1 | 10/2005 | Nadzam |
| 2006/0081579 | A1 | 4/2006 | Kotecki |
| 2006/0096966 | A1 | 5/2006 | Munz |
| 2006/0128946 | A1 | 6/2006 | Weiner |
| 2006/0186103 | A1 | 8/2006 | Rajan |
| 2006/0196919 | A1 | 9/2006 | James |
| 2006/0207984 | A1 | 9/2006 | Karogal |
| 2006/0255027 | A1 | 11/2006 | Katiyar |
| 2006/0261054 | A1 | 11/2006 | Katiyar |
| 2006/0278627 | A1 | 12/2006 | Burt |
| 2006/0283848 | A1 | 12/2006 | Karogal |
| 2006/0289394 | A1 | 12/2006 | Revel |
| 2007/0090168 | A1 | 4/2007 | Snow |

(56) References Cited

U.S. PATENT DOCUMENTS

| | | |
|---|---|---|
| 2008/0000892 A1 | 1/2008 | Hirano |
| 2008/0014458 A1 | 1/2008 | Posch |
| 2008/0103228 A1 | 5/2008 | Falcone |
| 2008/0206594 A1 | 8/2008 | Fukuda |
| 2008/0272100 A1 | 11/2008 | Amata |
| 2009/0017328 A1 | 1/2009 | Katoh |
| 2009/0039065 A1 | 2/2009 | Nakamura |
| 2009/0095720 A1 | 4/2009 | Kamei |
| 2009/0158889 A1 | 6/2009 | Kodama |
| 2009/0242536 A1 | 10/2009 | Nagashima |
| 2009/0314759 A1 | 12/2009 | Schaeffer |
| 2009/0314760 A1 | 12/2009 | Mizumoto |
| 2009/0321404 A1 | 12/2009 | Keegan |
| 2010/0147818 A1 | 6/2010 | Fondriest |
| 2011/0017712 A1 | 1/2011 | Wada |
| 2011/0114606 A1 | 5/2011 | Suzuki |
| 2011/0174784 A1 | 7/2011 | Kamei |
| 2011/0178210 A1 | 7/2011 | Tiquet |
| 2011/0297658 A1 | 8/2011 | Peters |
| 2011/0240604 A1 | 10/2011 | Panday |
| 2011/0253691 A1 | 10/2011 | Kodama |
| 2012/0130065 A1 | 5/2012 | Labeau |
| 2012/0248069 A1 | 10/2012 | Fisher |
| 2013/0012696 A1 | 1/2013 | Adden |
| 2013/0043219 A1 | 2/2013 | Peters et al. |
| 2013/0153557 A1* | 6/2013 | Pagano ............ B23K 9/09 219/130.51 |
| 2013/0193124 A1 | 8/2013 | Peters |
| 2013/0233839 A1 | 9/2013 | Barhorst |
| 2013/0292362 A1 | 11/2013 | Fairchild |
| 2013/0313240 A1 | 11/2013 | Amata |
| 2014/0061166 A1 | 3/2014 | Barhorst |
| 2014/0061175 A1 | 3/2014 | Barhorst |
| 2014/0061179 A1 | 3/2014 | Barhorst |
| 2015/0038584 A1 | 2/2015 | Fridman |
| 2015/0096965 A1 | 4/2015 | Kawamoto |
| 2015/0275341 A1 | 10/2015 | Cheney |

FOREIGN PATENT DOCUMENTS

| | | |
|---|---|---|
| CN | 1323673 | 11/2001 |
| CN | 17149840 | 1/2006 |
| CN | 1974106 | 6/2007 |
| CN | 101288918 | 10/2008 |
| CN | 101323057 | 12/2008 |
| CN | 101618486 | 1/2010 |
| CN | 10265792 | 8/2010 |
| CN | 102009286 | 4/2011 |
| CN | 102059476 | 5/2011 |
| CN | 102091881 | 6/2011 |
| CN | 102371444 | 3/2012 |
| CN | 102990244 | 3/2013 |
| CN | 103381525 | 11/2013 |
| CN | 103920965 | 7/2014 |
| CN | 104093517 | 10/2014 |
| EP | 0652071 | 5/1995 |
| EP | 0688630 | 12/1995 |
| EP | 1155769 | 11/2001 |
| EP | 1537940 | 6/2005 |
| EP | 1775060 | 4/2007 |
| EP | 2110195 | 10/2009 |
| EP | 2341159 | 7/2011 |
| GB | 363815 | 12/1931 |
| GB | 863072 | 3/1961 |
| GB | 937063 | 9/1963 |
| GB | 1007039 | 10/1965 |
| GB | 1383304 | 2/1974 |
| GB | 1497347 | 1/1978 |
| JP | S54056045 | 5/1979 |
| JP | S57159294 | 10/1982 |
| JP | S60257992 | 12/1985 |
| JP | S6281288 | 4/1987 |
| JP | S63212093 | 9/1988 |
| JP | 02274395 | 11/1990 |
| JP | 2010005674 | 1/2010 |
| KR | 1020090026355 | 3/2009 |
| SU | 407695 | 12/1973 |
| WO | 8907036 | 8/1982 |
| WO | 2005115680 | 12/2005 |
| WO | 2008004699 | 1/2008 |
| WO | 2011120533 | 10/2011 |
| WO | 2014036035 | 3/2014 |
| WO | 2014113155 | 7/2014 |

OTHER PUBLICATIONS

Arc Welding Automotive Components, Chrysler Group LLC Process Standard Category Code: D-1, Sep. 8, 2009, pp. 1-16.
International Search Report from PCT application No. PCT/US2013/074533, dated Sep. 30, 2014, 16 pgs.
International Search Report from PCT application No. PCT/US2013/074536, dated Sep. 29, 2014, 6 pgs.
International Search Report from PCT application No. PCT/US2013/056907, dated Dec. 13, 2013, 14 pgs.
"Sodium Carboxymethyl Cellulose," FNP 13/2, 1984.
"Sodium Carboxymethylcellulose: Physical and Chemical Properties," Hercules Incorporated, Aqualon Division, 1999.
Baker, Cathleen; "Methylcellulose & Sodium Carboxymethylcellulose: Uses in Paper Conservation," The American Institute for Conservation, Fall 1982.
"Specification for Stainless Steel Flux Cored and Metal Cored Welding Electrodes and Rods," American Welding Society 4th Edition, AWS 5.22/A5.22M:2010, Aug. 27, 2009, ISBN 978-0-87171-764-1, pp. 3, 18, 19, 28, and 29.
U.S. Appl. No. 13/418,148, unpublished application, filed Mar. 12, 2012.
U.S. Appl. No. 61/625,488, unpublished application, filed Apr. 17, 2012.
U.S. Appl. No. 61/651,279, unpublished applicaton, filed May 24, 2012.
International Search Report from PCT application No. PCT/US2014/059701, dated Jul. 10, 2015, 17 pgs.
International Search Report from PCT application No. PCT/US2015/055184, dated Jan. 27, 2016, 14 pgs.
Stainless Steel Overview (Stainless Plate Products) [retrieved on Sep. 26, 2017]. Retrieved from: <URL:http://http://www.sppusa.com/stainlesssteel_overview.php> (Year: 2017).
Tae-Jin, Kim, et al.; "Characteristics of Pulse MIG Arc Welding with a Wire Melting Rate Change by Current Polarity Effect," Journal of Electrical Engineering & Technology, vol. 2, No. 3, Sep. 1, 2007, pp. 366-372.
Du et al., "Welding of Dissimilar Metals", May 31, 1986, pp. 43-44.
Wu et al., "Guide for Selecting Welding Wire (Second Edition)", Jun. 30, 2011, p. 45.
Wu et al., "Welding Technology", Jul. 31, 2002, pp. 133-135.
Palmer et al., "Subsea Pipeline Engineering (Second Edition)", Aug. 31, 2013, p. 46.
Huang et al., "Corrosion Resistance and Corrosion Data of Materials", Jan. 31, 2003, p. 19.
Wen et al., "Development Technology of Welding Rod", Jun. 30, 2001, pp. 69-72.
Xue et al., "Manual of Welding Materials", Jan. 31, 2006, pp. 10-11.
AWS A.36/A5.36M: 2016 An American National Standard.
American Welding Society, AWS, AWS Welding Inspector Examination/Certification part B 2006: Examination Book of Specifications, [http:// https:l/app.aws.org/certification/docs/partb2006 .pdf] accessed: May 8, 2020 (Year: 2006).
Metalsupermarkets.com, What is mild Steel?, [http:// https:l/www.metalsupermarkets.com/what-is-mild-steell] Accessed: May 8, 2020 (Year: 2016).
Zirong Zhang, et. al., "Welding Electrode (Design, Manufacture and Selection)", Machinery Industry Press, First edition and First printing of Jun. 1996.
Chen Hui, et. al., "New Welding Technology", Shanghai Science and Technology Press, Apr. 30, 1981, pp. 131-132.
Tang Zhongming, et. al., "The Welder", Shandong Science and Technology Press, Jan. 31, 2015, Table 2-26 of p. 65.

(56) References Cited

OTHER PUBLICATIONS

McHugh, "Chapter 2—Production, Properties and Uses of Alginates," www.fao.org/3/x5822e04.htm, Sep. 25, 2021, 39 pages.
EPO, "Communication pursuant to Article 94(3) EPC," issued in Application No. 16194283.4, dated Oct. 14, 2021, 6 pages.

\* cited by examiner

SYSTEMS AND METHODS FOR WELDING MILL SCALED WORKPIECES

CROSS-REFERENCE TO RELATED APPLICATIONS

This application is a continuation application of U.S. application Ser. No. 14/879,578, entitled "SYSTEMS AND METHODS FOR WELDING MILL SCALED WORKPIECES", filed Oct. 9, 2015, now U.S. Pat. No. 10,300,565, which claims priority to and the benefit of U.S. Provisional Application Ser. No. 62/065,371, entitled "SYSTEMS AND METHODS FOR WELDING MILL SCALED WORKPIECES", filed Oct. 17, 2014, both of which are hereby incorporated by reference in their entirety for all purposes.

BACKGROUND

The disclosure relates generally to Gas Metal Arc Welding (GMAW) and, more specifically, to Metal-cored Arc Welding (MCAW) of mill scaled steel workpieces.

Arc welding is commonly used in numerous applications such as shipbuilding, offshore platform, construction, heavy equipment, pipe mills, and so forth. Certain arc welding processes (e.g., Gas Metal Arc Welding (GMAW) and Metal-cored Arc Welding (MCAW)) utilize welding wire, which generally provides a supply of filler metal for the weld deposit and provides a path for current during the arc welding process. Tubular welding wire, for example, includes a metallic sheath encircling a granular core. In particular, metal-cored welding wires are a type of tubular welding wire that generally produce a substantially slag-free weld deposit, which reduces post-weld processing compared to other types of tubular welding wire, such as flux-cored tubular welding wires.

One type of steel workpiece that is common to structural and heavy equipment applications is hot-rolled steel. Since hot-rolled steel is generally cooled in an oxygen-containing atmosphere, it forms a mixed iron oxide coating layer commonly referred to as mill scale. This mill scale coating provides a barrier layer that, while it remains intact, protects the underlying steel from further oxidation. Before mill scaled steel workpieces are used in a GMAW or MCAW process, they are typically descaled to remove the mill scale coating via pickling or abrasive blasting, which adds significant time and cost to the welding process.

BRIEF DESCRIPTION

In an embodiment, a metal-cored welding wire includes a sheath and a core and is capable of welding mill scaled workpieces without prior descaling. The metal-cored welding wire has a sulfur source that occupies between approximately 0.04% and approximately 0.18% of the weight of the metal-cored welding wire, and has a cellulose source that occupies between approximately 0.09% and approximately 0.54% of the weight of the metal-cored welding wire.

In an embodiment, a method of welding a mill scaled steel workpiece includes: advancing a metal-cored welding wire toward a mill scaled steel workpiece, wherein the metal-cored welding wire has sheath and a core, and wherein the metal-cored welding wire includes a sulfur source and a cellulose source. The method includes providing a shielding gas flow near the surface of the mill scaled steel workpiece and electrifying the metal-cored welding wire to establish an arc between the metal-cored welding wire and the mill scaled steel workpiece. The method further includes forming a weld deposit on the mill scaled steel workpiece without forming a substantial slag layer.

In an embodiment, a method of manufacturing a metal-cored welding wire includes: disposing a granular core within a metallic sheath to form the metal-cored welding wire. The core of the metal-cored welding wire includes a sulfur source that occupies between approximately 0.2% and approximately 1% of the core by weight; and a cellulose source that occupies between approximately 1% and approximately 3% of the core by weight. The method further includes compressing the metallic sheath around the core to form the metal-cored welding wire.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. It should be appreciated that, as used herein, the term "tubular welding electrode" or "tubular welding wire" may refer to any welding wire or electrode having a metal sheath and a granular or powdered core, such as metal-cored or flux-cored welding electrodes. It should also be appreciated that the term "stabilizer" or "additive" may be generally used to refer to any component of the tubular welding that improves the quality of the arc, the quality of the weld, or otherwise affect the welding process. Furthermore, as used herein, "approximately" may generally refer to an approximate value that may, in certain embodiments, represent a difference (e.g., higher or lower) of less than 0.01%, less than 0.1%, or less than 1% from the actual value. That is, an "approximate" value may, in certain embodiments, be accurate to within (e.g., plus or minus) 0.01%, within 0.1%, or within 1% of the stated value. As used herein, a "source" (e.g., a sulfur source) is used to indicate a chemical or compound that includes the identified element, regardless of its chemical state (e.g., sulfate, sulfite, sulfide, etc.). As used herein, "without substantial" or "substantially free of" may refer to a component or feature that is completely absent, a feature that is only present to a very limited degree (e.g., less than 1%), or a feature that is not present at a significant level, as judged by one of ordinary skill in the art.

As set forth above, mill scaled steel workpieces are common in structural and heavy equipment applications and are usually descaled before MCAW. This descaling (e.g., pickling or abrasive blasting) is typically performed since the iron oxide of the mill scale coating can prevent the weld pool from adequately melting and flowing at (e.g., from adequately wetting) toe lines when welding mill scaled workpieces, and this problem is further exacerbated by high travel speeds. It may be noted that mill scaled workpieces may be welded without descaling using, for example, flux-cored welding wires in a flux-cored arc welding (FCAW) process. However, as set forth above, flux-cored welding wires generally form a slag layer over the weld deposit that increases post-weld processing time to remove. Additionally, flux-cored welding wires produce a greater amount of welding fumes and spatter that may not be acceptable for certain applications. Accordingly, present embodiments are directed toward metal-cored welding wires that are capable of forming high quality weld deposits with good bead shape on mill scaled steel workpieces. As such, the disclosed metal-cored welding wires enable MCAW operations without first descaling mill scaled steeled workpieces. Since workpieces are typically cleaned, for example, using abrasive blasting after welding, the presently disclosed metal-cored welding wires enable welding processes on mill scaled steel workpieces involving only a single (i.e., post-weld) surface treatment, improving the efficiency of the welding process.

In particular, the disclosed metal-cored welding wires include certain components that enable the arc to efficiently penetrate the mill scaled coating and to enable the weld pool to effectively wet the surface of the mill scaled workpiece. These components include intentional additions of one or more of: a sulfur source, an antimony source, and a cellulose source. In certain embodiments, the disclosed metal-cored welding wire includes a sulfur source (e.g., potassium sulfate) to ensure the weld pool effectively wets the surface of the workpiece. In certain embodiments, the disclosed metal-cored welding wire includes an antimony source (e.g., antimony oxide) as a surface active agent that helps to locate silicon island formation away from weld bead toe lines and toward the center on the weld bead, where they are much easier to remove. In certain embodiments, the disclosed metal-cored welding wire includes a cellulose source (e.g., cellulose paper, sodium carboxymethyl cellulose) to aid in penetrating the mill scale coating and wetting the underlying steel surface. In particular, the inventors have identified that, while each of these components individually improves the weldability of mill scaled steel workpieces, the components are even more effective in combination (e.g., sulfur/antimony, sulfur/cellulose, sulfur/antimony/cellulose). Further, it may be appreciated that, in general, the sulfur content of a welding wire is typically minimized to avoid sulfur-induced cracking in the weld deposit, and as such, the intentional inclusion of a sulfur source in certain presently disclosed metal-cored welding wire embodiments is not a common feature of metal-cored welding wires.

Figure 1:
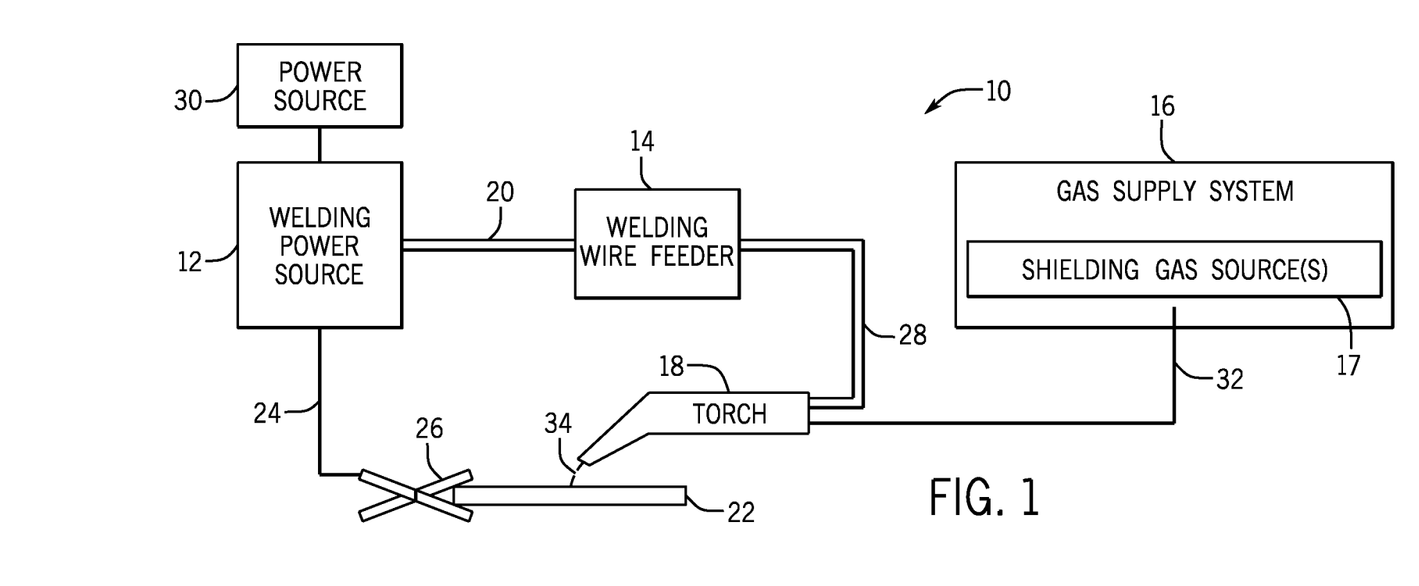
FIG. 1 is a block diagram of a metal-cored arc welding (MCAW) system, in accordance with embodiments of the present disclosure.

Turning to the figures, FIG. 1 illustrates an embodiment of a metal-cored arc welding (MCAW) system 10 that utilizes a metal-cored tubular welding wire, in accordance with the present disclosure. The welding system 10 includes a welding power source 12, a welding wire feeder 14, a gas supply system 16, and a welding torch 18. The welding power source 12 generally supplies power to the welding system 10 and may be coupled to the welding wire feeder 14 via a cable bundle 20 as well as coupled to a mill scaled workpiece 22 using a lead cable 24 having a clamp 26. In the illustrated embodiment, the welding wire feeder 14 is coupled to the welding torch 18 via a cable bundle 28 in order to supply consumable, metal-cored welding wire (i.e., the tubular welding electrode) and power to the welding torch 18 during operation of the welding system 10. In another embodiment, the welding power unit 12 may couple and directly supply power to the welding torch 18.

The welding power source 12 may generally include power conversion circuitry that receives input power from an alternating current power source 30 (e.g., an AC power grid, an engine/generator set, or a combination thereof), conditions the input power, and provides DC or AC output power via the cable 20. As such, the welding power source 12 may power the welding wire feeder 14 that, in turn, powers the welding torch 18, in accordance with demands of the welding system 10. The lead cable 24 terminating in the clamp 26 couples the welding power source 12 to the workpiece 22 to close the circuit between the welding power source 12, the workpiece 22, and the welding torch 18. The welding power source 12 may include circuit elements (e.g., transformers, rectifiers, switches, and so forth) capable of converting the AC input power to a direct current electrode positive (DCEP) output, direct current electrode negative (DCEN) output, DC variable polarity, pulsed DC, or a variable balance (e.g., balanced or unbalanced) AC output, as dictated by the demands of the welding system 10.

The illustrated welding system 10 includes a gas supply system 16 that supplies a shielding gas or shielding gas mixtures from one or more shielding gas sources 17 to the welding torch 18. In the depicted embodiment, the gas supply system 16 is directly coupled to the welding torch 18 via a gas conduit 32. In another embodiment, the gas supply system 16 may instead be coupled to the wire feeder 14, and the wire feeder 14 may regulate the flow of gas from the gas supply system 16 to the welding torch 18. A shielding gas, as used herein, may refer to any gas or mixture of gases that may be provided to the arc and/or weld pool in order to provide a particular local atmosphere (e.g., to shield the arc, improve arc stability, limit the formation of metal oxides, improve wetting of the metal surfaces, alter the chemistry of the weld deposit, and so forth). In certain embodiments, the shielding gas flow may be a shielding gas or shielding gas mixture (e.g., argon (Ar), helium (He), carbon dioxide ($CO_2$), oxygen ($O_2$), nitrogen ($N_2$), similar suitable shielding gases, or any mixtures thereof). For example, a shielding gas flow (e.g., delivered via the conduit 32) may include Ar, Ar/$CO_2$ mixtures (e.g., between 1% and 99% $CO_2$ in Ar), Ar/$CO_2$/$O_2$ mixtures, Ar/He mixtures, and so forth. By specific example, in certain embodiments, the shielding gas flow may include 100% Ar; 75% Ar and 25% $CO_2$; 90% Ar and 10% $CO_2$; or 98% Ar and 2% $O_2$.

Accordingly, the illustrated welding torch 18 generally receives the metal-cored welding wire, power from the welding wire feeder 14, and a shielding gas flow from the gas supply system 16 in order to perform MCAW of the mill scaled workpiece 22. During operation, the welding torch 18 may be brought near the mill scaled workpiece 22 so that an arc 34 may be formed between the consumable metal-cored welding wire exiting a contact tip of the welding torch 18 and the mill scaled workpiece 22. Additionally, as discussed below, by controlling the composition of the metal-cored welding wire, the chemistry of the arc 34 and/or the resulting weld (e.g., composition and physical characteristics) may be varied. For example, the metal-cored welding wire includes alloying components that may become at least partially incorporated into the weld deposit, affecting the mechanical properties of the weld. Furthermore, other components of the disclosed metal-cored welding wire may aid in penetrating the mill scale coating (e.g., a cellulose source), wetting the surface of the mill scaled workpiece 22 (e.g., a sulfur source and/or a cellulose source), and assist in locating silicon island formation to facilitate better removal (e.g., an antimony source).

Figure 2:
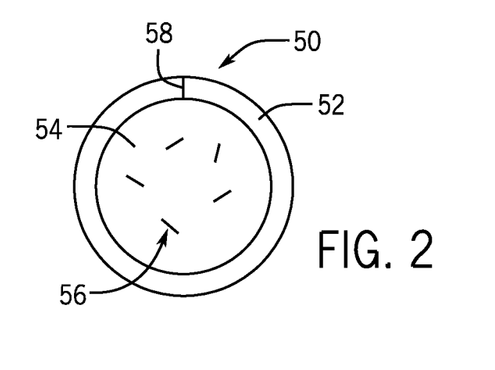
FIG. 2 is a cross-sectional view of a metal-cored welding wire, in accordance with embodiments of the present disclosure.

A cross-section of an embodiment of the presently disclosed metal-cored welding wire is illustrated in FIG. 2. FIG. 2 illustrates a metal-cored tubular welding wire 50 that includes a metallic sheath 52, which encapsulates a granular or powdered core 54 (also referred to as filler). The metallic sheath 52 of the metal-cored welding wire 50 illustrated in FIG. 2 may be manufactured from any suitable metal or alloy, such as steel. It should be appreciated that the composition of the metallic sheath 52 may affect the composition of the resulting weld and/or the properties of the arc 34. In certain embodiments, the metallic sheath 52 may account for between approximately 80% and 90% of the total weight of the tubular welding wire 50. Additionally, in certain embodiments, the metallic sheath 52 may be made of mostly iron, with various inclusions (e.g., carbon, manganese, etc.) to adjust the desired properties of the metallic sheath 52 and the resulting weld deposit.

The granular core 54 of the illustrated metal-cored welding wire 50 may generally be a compacted powder. In certain embodiments, the granular core 54 may account for between approximately 5% and approximately 40% or between approximately 10% and approximately 20% of the total weight of the metal-cored welding wire 50. For example, in certain embodiments, the granular core 54 may provide approximately 14%, approximately 15%, approximately 16%, approximately 17%, approximately 18%, approximately 19%, or approximately 20% of the total weight of the tubular welding wire 50. Furthermore, in certain embodiments, the components of the granular core 54, discussed below, may be homogenously or non-homogenously (e.g., in clumps or clusters 56) disposed within the granular core 54. In certain embodiments, all of the aforementioned components of the metal-cored welding wire 50 that enable MCAW of mill scaled steel (e.g., a sulfur source, an antimony source, a cellulose source) may be included in the granular core 54. Furthermore, it may be appreciated that, in certain embodiments, the metal-cored welding wire 50 may be completely or substantially free of indium (e.g., may not include any intentional addition of indium).

Tables 1 and 2 indicate the components of embodiments of the disclosed metal-cored welding wire 50, which include at least one sulfur source and an antimony source, to enable MCAW of mill scaled steel workpieces. Additionally, the embodiment indicated in Table 2 includes a cellulose source (e.g., sodium carboxymethyl cellulose (NaCMC)) to enable MCAW of mill scaled steel workpieces. Indeed, in certain embodiments, the disclosed metal-cored welding wire 50 may include at least one sulfur source and at least one cellulose source, and may not include an antimony source. In general, by using two or more of these components together in various combinations, the size, volume, location of silicon islands may be adjusted. It may be appreciated that the effect that the combination of the sulfur source, the antimony source, and/or the cellulose source together has on silicon island formation is greater than the effect observed for either component individually.

In particular, for the embodiment of the metal-cored welding wire 50 described by Table 1, the sulfur source is potassium sulfate and the antimony source is antimony oxide. The embodiment of the metal-cored welding wire 50 described by Table 2, there are two sulfur sources (i.e., potassium sulfate and iron sulfide), the antimony source is antimony oxide, and the cellulose source is NaCMC. In other embodiments, the metal-cored welding wire 50 may include only iron sulfide or molybdenum disulfide as the sulfur source, for example, to provide a better reducing environment to deal with the mill scale coating. Additionally, in certain embodiments, the cellulose source may include of cellulose paper in addition to, or in alternative to, NaCMC.

TABLE 1

Composition of an example embodiment of the disclosed welding wire. Values are indicated as percentage (%) of the core, percentage (%) of the sheath, or percentage (%) of the entire metal-cored welding wire.

| Core Composition | | | Sheath Composition | | | Wire Composition | |
| --- | --- | --- | --- | --- | --- | --- | --- |
| Component | % of Core | % of Wire | Component | % of Sheath | % of Wire | Component | % of Wire |
| Magnesium powder | 0.28 | 0.05 | Carbon | 0.025 | 0.0205 | Sheath | 82 |
| Iron powder | 68 | 12.24 | Iron | 99.67 | 81.73 | Core | 18 |
| Ferroboron powder (1% Boron) | 3.1 | 0.56 | Manganese | 0.3 | 0.246 | | |
| Potassium sulfate | 0.6 | 0.11 | | | | | |
| Antimony oxide | 1.1 | 0.20 | | | | | |
| Manganous oxide | 0.2 | 0.04 | | | | | |
| Manganese metal powder | 9.2 | 1.66 | | | | | |
| Ferro-titanium (40% grade) | 4.82 | 0.87 | | | | | |
| Ferro-zirconium-silicon powder | 2.6 | 0.47 | | | | | |
| Sodium fluoride | 1.1 | 0.20 | | | | | |
| Ferro-silicon powder | 9 | 1.62 | | | | | |

TABLE 2

Composition of another example embodiment of the disclosed welding wire.
Values are indicated as percentage (%) of the core, percentage (%) of the sheath, or
percentage (%) of the entire metal-cored welding wire.

| Core Composition | | | Sheath Composition | | | Wire Composition | |
|---|---|---|---|---|---|---|---|
| Component | % of Core | % of Wire | Component | % of Sheath | % of Wire | Component | % of Wire |
| Iron powder | 68.20 | 12.28 | Carbon | 0.0738 | 0.0605 | Sheath | 82 |
| Potassium sulfate | 0.20 | 0.04 | Iron | 99.67 | 81.7294 | Core | 18 |
| Antimony oxide | 0.80 | 0.14 | Manganese | 0.33 | 0.2706 | | |
| Rare earth silicide | 2.00 | 0.36 | | | | | |
| Sodium carboxymethyl cellulose | 1.00 | 0.18 | | | | | |
| Manganous oxide | 1.00 | 0.18 | | | | | |
| Nickel powder | 3.00 | 0.54 | | | | | |
| Ferro-titanium (40% grade) | 1.10 | 0.20 | | | | | |
| Ferro-manganese silicon powder | 17.10 | 3.08 | | | | | |
| Graphite, granular | 0.50 | 0.09 | | | | | |
| Ferro-silicon powder | 4.80 | 0.86 | | | | | |
| Iron sulphide | 0.30 | 0.05 | | | | | |

As illustrated in Tables 1 and 2, in certain embodiments, the sulfur source (e.g., potassium sulfate) may account for between approximately 0.04% and approximately 0.18%, between approximately 0.06% and approximately 0.16%, between approximately 0.08% and approximately 0.13%, or between approximately 0.09% and approximately 0.11% of the metal-cored welding wire 50 by weight. In certain embodiments, the sulfur source may account for between approximately 0.2% and approximately 1%, between approximately 0.33% and approximately 0.86%, between approximately 0.46% and approximately 0.73%, or between approximately 0.5% and approximately 0.6% of the granular core 54 by weight. It may be appreciated that, in certain embodiments, the sulfur source may be implemented as a lubricating and/or corrosion-resistant coating disposed on an outer surface of the metal-cored welding wire 50. For example, in certain embodiments, the sulfur source may be molybdenum sulfide, or another suitable sulfur-based lubricant, coated onto the outer surface of the metal sheath 52 of the metal-cored welding wire 50. However, it is believed that delivering a sulfur source to the weld pool via the granular core 54 of the metal-cored welding wire 50 may provide greater control over the amount and rate of delivery of the sulfur source to the weld pool and/or provides a better vehicle for delivering the sulfur source to the weld pool to improve the wetting of the surface of the mill scaled workpiece. This improved control in the delivery of the sulfur source is helpful since, as set forth above, exceeding a particular threshold (e.g., approximately 0.6 wt % or approximately 0.3 wt %) in sulfur content within the weld deposit may result in cracking, weakening the mechanical strength of the weld deposit. It may be noted that it is also presently considered that, in certain embodiments, the sulfur source may, additionally or alternatively, be a sulfur-containing gas (e.g., sulfur hexafluoride ($SF_6$)) that is provided by the gas supply system 16 (e.g., as a mixture with the shielding gas), while the antimony source and/or cellulose source may be provided by the metal-cored welding wire 50 for a similar effect.

In certain embodiments, the antimony source (e.g., antimony oxide) may account for between approximately 0.09% and approximately 0.36%, between approximately 0.13% and approximately 0.3%, between approximately 0.16% and approximately 0.25%, or approximately 0.2% of the metal-cored welding wire 50 by weight. In certain embodiments, the antimony source may account for between approximately 0.5% and approximately 2%, between approximately 0.7% and approximately 1.7%, between approximately 0.9% and approximately 1.4%, or approximately 1% of the granular core 54 by weight. In other embodiments, antimony may instead be alloyed into the composition of the metal sheath 52 of the metal-cored welding wire 50. As mentioned, certain embodiment of the metal-cored welding wire 50 may not include an antimony source.

In certain embodiments, the cellulose source may be a Group I or Group II salt of carboxymethyl cellulose (e.g., NaCMC). In certain embodiments, the cellulose source may account for between approximately 0.09% and approximately 0.54%, between approximately 0.1% and approximately 0.36%, between approximately 0.15% and approximately 0.27%, or approximately 0.18% of the metal-cored welding wire 50 by weight. In certain embodiments, the cellulose source may account for between approximately 0.5% and approximately 3%, between approximately 0.6% and approximately 2%, between approximately 0.8% and approximately 1.5%, or approximately 1% of the granular core 54 by weight.

Additionally, presently disclosed embodiments of the metal-cored welding wire 50 also include carbon present in the sheath 54, the core 52, or a combination thereof, to stabilize the arc 34 and/or increase the carbon content of the weld. As indicated in Table 2, in certain embodiments, the carbon source may be graphite, carbon black, or similar carbon source disposed in the core 52. In certain embodiments, these carbon sources may account for between approximately 0.25% and approximately 0.75%, between approximately 0.4% and approximately 0.6%, or approximately 0.5% of the core 52 by weight. In certain embodiments, these carbon sources of the core 54 may account for between approximately 0.05% and approximately 0.14%, between approximately 0.07% and approximately 0.11%, or approximately 0.09% of the metal-cored welding wire 50 by weight.

As illustrated in Table 2, in certain embodiments, the metal-cored welding wire 50 may also include rare earth silicide (e.g., available from Miller and Company of Rosemont, Ill.), which may include rare earth elements (e.g., cerium and lanthanum) and other non-rare earth elements (e.g., iron and silicon). In certain embodiments, the rare earth silicide may account for between approximately 0.09% and approximately 0.72%, between approximately 0.18% and approximately 0.54%, or approximately 0.36% of the metal-cored welding wire 50 by weight. In certain embodiments, the rare earth silicide may account for between approximately 0.5% and approximately 4%, between approximately 1% and approximately 3%, or approximately 2% of the core 54 by weight.

TABLE 3

Computed chemical composition of the embodiment of the metal-cored welding wire 50 described by Table 2.
Chemical Composition of Wire

| Chemical | wt % |
| --- | --- |
| Aluminum | 0.0079 |
| Carbon | 0.1749 |
| Calcium | 0.003 |
| Cobalt | 0.0014 |
| Iron | 95.1963 |
| Lanthanum | 0.1086 |
| Manganese | 2.2427 |
| Nickel | 0.5403 |
| Phosphorus | 0.0052 |
| Sulfur | 0.0269 |
| Antimony Oxide | 0.1442 |
| Silicon | 1.47 |
| Titanium | 0.081 |

Table 3 includes a computed chemical composition of the embodiment of the metal-cored welding wire 50 described by Table 2 above. It may be appreciated that certain ingredients described in Table 2 may contribute multiple elements to the total chemical composition of the metal-cored welding wire 50 indicated in Table 3. For example, as described in Tables 2 and 3, both the NaCMC and graphite contribute to the total carbon content of the embodiment of the metal-cored welding wire 50. In certain embodiments, formulation of the metal-cored welding wire 50 may be designed to provide a total chemical composition in which particular elements are present in particular ranges. For example, in certain embodiments, the metal-cored welding wire 50 may include carbon-containing ingredients or sources (e.g., in the sheath 52 and/or in the core 54 as NaCMC and/or graphite) to provide a particular total carbon content (e.g., greater than approximately 0.12 wt %, between approximately 0.13 wt % and approximately 0.21 wt %, between approximately 0.15 wt % and approximately 0.18 wt %, or approximately 0.17 wt %) for the metal-cored welding wire 50. By further example, in certain embodiments, the metal-cored welding wire 50 may include silicon sources (e.g., ferro-silicon powder, ferro-zirconium-silicon powder, rare earth silicide) to provide a particular total silicon content (e.g., greater than approximately 0.12 wt %, between approximately 1 wt % and approximately 2 wt %, between approximately 1.25 wt % and approximately 1.75 wt %, or approximately 1.5 wt %) for the metal-cored welding wire 50. In certain embodiments, the metal-cored welding wire 50 may include between approximately 0.25 wt % and approximately 0.75 wt %, or approximately 0.54 wt % nickel as alloying powders in the core 54 and/or alloyed into the sheath 52. In certain embodiments, the metal-cored welding wire 50 may include between approximately 2 wt % and approximately 2.5 wt %, or approximately 2.25 wt % manganese as alloying powders in the core 54 and/or alloyed into the sheath 52.

Figure 3:
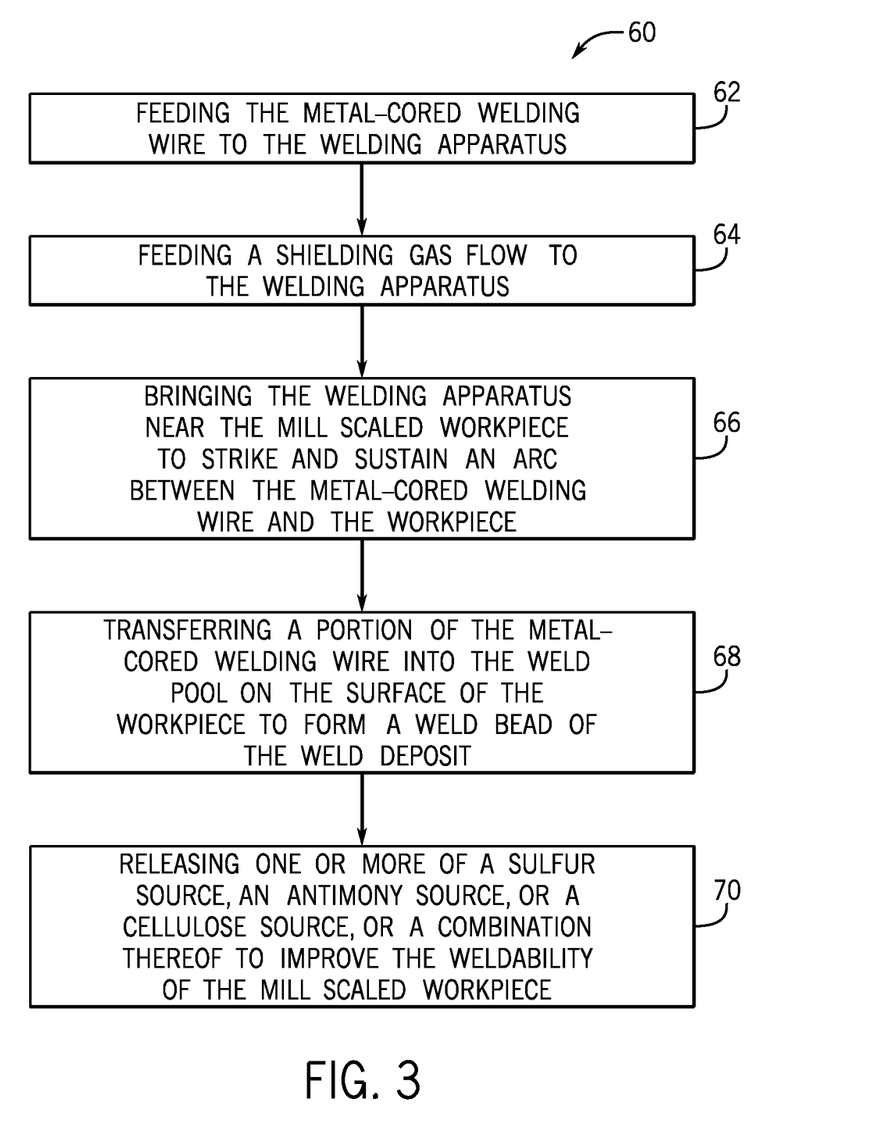
FIG. 3 is a process by which the metal-cored welding wire may be used to weld a mill scaled workpiece, in accordance with embodiments of the present disclosure.

FIG. 3 illustrates an embodiment of a process 60 by which a mill scaled workpiece 22 may be welded using the disclosed welding system 10 and the metal-cored tubular welding wire 50. The illustrated process 60 begins with feeding (block 62) the tubular welding wire 50 to a welding apparatus (e.g., welding torch 18). As set forth above, in certain embodiments, the metal-cored welding wire 50 may include a sulfur source, an antimony source, a cellulose source, or combinations thereof, to enable welding of a mill scale workpiece. Additionally, the process 60 includes providing (block 64) a shielding gas flow (e.g., 100% argon, 100% carbon dioxide, 75% argon/25% carbon dioxide, 90% argon/10% carbon dioxide, or similar shielding gas flow) near the contact tip of the welding apparatus (e.g., the contact tip of the torch 18).

Next, the welding apparatus (e.g., welding torch 18) may be brought near (block 66) the mill scaled workpiece 22 to strike and sustain an arc 34 between the metal-cored welding wire 50 and the workpiece 22. It should be appreciated that the arc 34 may be produced using, for example, a DCEP, DCEN, DC variable polarity, pulsed DC, balanced or unbalanced AC power configuration for the MCAW system 10. Once the arc 34 has been established to the workpiece 22, a portion of the metal-cored welding wire 50 (e.g., filler metals, such as iron, and alloying components, such as boron) may be transferred (block 68) into the weld pool on the surface of the workpiece 22 to form a weld bead of a weld deposit. Meanwhile, the other components (e.g., the sulfur source, the antimony source, and/or the cellulose source) of the metal-cored welding wire 50 may be released (block 70) to aid in penetrating the mill scaled surface of the workpiece 22, to enhance the ability of the weld pool to wet the underlying steel, and/or to prevent (e.g., block or deter) the formation of silicon islands on the surface of the weld deposit. Accordingly, the components of the disclosed embodiments of the metal-cored welding wire 50 cooperate to form quality welds on mill scaled steel that have a good appearance (e.g., no substantial dimples, divots, or depressions) and good mechanical properties. Furthermore, it may be appreciated that the disclosed process 60 obviates additional pre-welding surface preparation steps (e.g., pickling and/or abrasive blasting) that are typically used for mill scaled workpieces in MCAW processes prior to the present disclosure.

TABLE 4

Welding parameters and the analyzed composition of the weld metal for an example welding operation, with the remainder being iron and trace elements. Wire feed speed and gun travel speed are provided in inches per minute (ipm). The workpiece is an A36 mill scaled plate.

| Welding Parameters | |
| --- | --- |
| Amps | 300 A |
| Voltage | 30 V, DCEP |
| Wire Feed Speed | 340 ipm |
| Gun travel speed | 13 ipm |
| Gas type | 90% Ar/10% $CO_2$ |
| Plate material | ¾ inch A36 |
| Passes | 13 |
| Electrical Stickout | ¾ inches |

| Chemistry of weld metal | |
| --- | --- |
| element | wt % |
| Carbon | 0.108 |
| Manganese | 1.962 |
| Phosphorus | 0.009 |
| Sulfur | 0.039 |
| Silicon | 1.28 |
| Copper | 0.068 |
| Chromium | 0.036 |
| Vanadium | 0.003 |
| Nickel | 0.599 |

TABLE 4-continued

Welding parameters and the analyzed composition of the weld metal for an example welding operation, with the remainder being iron and trace elements. Wire feed speed and gun travel speed are provided in inches per minute (ipm). The workpiece is an A36 mill scaled plate.

| | |
|---|---|
| Molybdenum | 0.015 |
| Aluminum | 0.012 |
| Titanium | 0.042 |
| Niobium | 0.003 |
| Cobalt | 0.005 |
| Boron | 0.0015 |
| Tungsten | 0.001 |
| Tin | 0.009 |
| Zirconium | 0.004 |
| Antimony | 0.12 |
| Arsenic | 0.006 |
| Iron + trace | remainder |

Table 4 includes welding parameters and weld metal chemistry for an example welding operation performed using the embodiment of the metal-cored welding wire 50 described by Table 2 on an A36 mill scaled plate. It should be appreciated that the welding parameters (e.g., current, voltage, gas type) are merely provided by way of example, and in other welding operations, these parameters may vary, as discussed in greater detail above. It may be appreciated that, while Table 4 indicates a weld having a carbon content of approximately 0.1 wt %, in other embodiments, the metal-cored welding wire 50 may produce weld deposits having greater than approximately 0.12 wt % carbon (e.g., between approximately 0.13 wt % and approximately 0.17 wt %, or approximately 0.15 wt %). It may also be noted that the various silicon sources in the core 54 of the metal-cored welding wire 50 of Table 2 (e.g., ferro-silicon powder, rare earth silicide) yield a weld deposit having a relatively high silicon content (e.g., greater than approximately 1 wt %, between approximately 1.2 wt % and approximately 1.4 wt %, or approximately 1.3 wt %). Additionally, in certain embodiments, the nickel content (e.g., between approximately 0.3 wt % and approximately 0.9 wt %, between approximately 0.4 wt % and approximately 0.8 wt %, or approximately 0.6 wt %) and the manganese content (e.g., between approximately 1.6 wt % and approximately 2.4 wt %, between approximately 1.8 wt % and approximately 2.2 wt %, or approximately 2 wt %) of the weld deposit enable the weld to achieve the desired physical properties (e.g., strength, toughness).

In terms of physical properties, in certain embodiments, the disclosed metal-cored welding wires 50 are capable of producing weld deposits in accordance with American Welding Society (AWS) 5.18 and/or 5.20. As such, in certain embodiments, the disclosed metal-cored welding wires 50 can produce a weld deposit having a ultimate tensile strength (UTS) of at least 70 kilopound per square inch (ksi), and a Charpy-V-Notch toughness greater than 20 foot-pounds (ft-lbs) at −20° F. and at −40° F. The example weld deposit of Table 4 provides an UTS of approximately 114 ksi, a yield strength of approximately 99.4 ksi, and a minimum elongation of approximately 15.5%. Additionally, the example weld deposit exhibited a Charpy-V-Notch toughness of approximately 22 foot-pounds (ft-lbs) at approximately −20° F., and approximately 25 ft-lbs at −40° F. It may be appreciated that the formulation of the metal-cored welding wire 50 may be modified within the ranges set forth above to tune the properties of the weld, for example, to increase the strength or ductility of the weld to meet the demands of particular applications.

Figure 4:
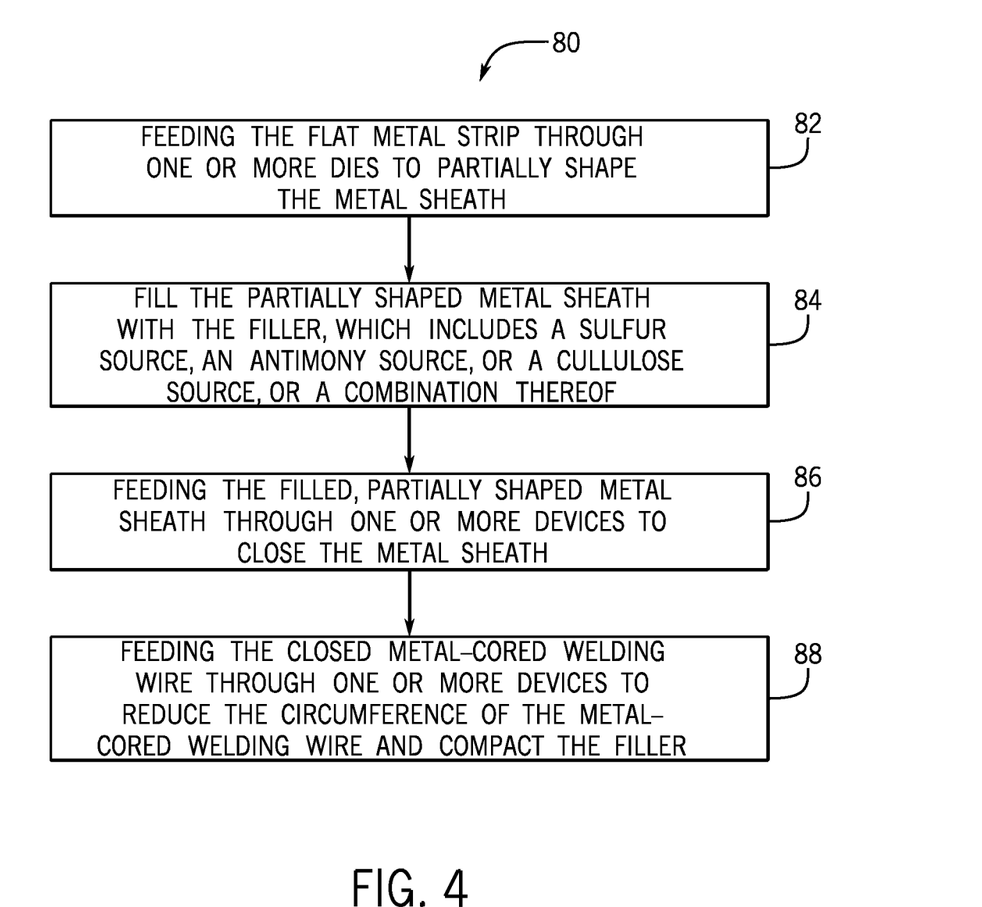
FIG. 4 is a process for manufacturing the metal-cored welding wire, in accordance with embodiments of the present disclosure.

FIG. 4 illustrates an embodiment of a process 80 by which the metal-cored tubular welding wire 50 may be manufactured. It may be appreciated that the process 80 merely provides an example of manufacturing a metal-cored welding wire 50; however, in other embodiments, other methods of manufacturing may be used to produce the metal-cored welding wire 50 without negating the effect of the present approach. That is, for example, in certain embodiments, the tubular welding wire 50 may be formed via a roll-forming method or via packing the core composition into a hollow metallic sheath. The process 80 illustrated in FIG. 4 begins with a flat metal strip being fed (block 82) through a number of dies that shape the strip into a partially circular metal sheath 52 (e.g., producing a semicircle or trough). After the metal strip has been at least partially shaped into the metal sheath 52, the metal sheath 52 may be filled (block 84) with the filler (e.g., the granular core 54). That is, the partially shaped metal sheath 52 may be filled with various components, including one or more of a sulfur source, an antimony source, and a cellulose source. As mentioned above, in certain embodiments, the antimony source may be included in the metal sheath 52, in the granular core 54, or in a combination thereof.

Next in the illustrated process 80, once the components of the granular core material 54 have been added to the partially shaped metal sheath 52, the partially shaped metal sheath 52 may then be fed through (block 86) one or more devices (e.g., drawing dies or other suitable closing devices) that may generally close the metal sheath 52 such that it substantially surrounds the granular core material 54 (e.g., forming a seam 58). Additionally, the closed metal sheath 52 may subsequently be fed through (block 88) a number of devices (e.g., drawing dies or other suitable devices) to reduce the circumference of the metal-cored welding wire 50 by compressing the granular core material 54. In certain embodiments, the metal-cored welding wire 50 may subsequently be heated or baked at between approximately 400° F. and approximately 600° F. for approximately 4 to 6 hours prior to packaging the metal-cored welding wire onto a spool, reel, or drum for transport, while, in other embodiments, the metal-cored welding wire 50 may be packaged without this baking step.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A metal-cored welding wire, comprising a metallic sheath that encapsulates a granular core, wherein the metal-cored welding wire comprises by weight of the metal-cored welding wire:
 a sulfur source;
 an antimony source; and
 between 0.05% and 0.14% of a carbon source.

2. The metal-cored welding wire of claim 1, wherein the sulfur source comprises at least one of potassium sulfate, iron sulfide, and molybdenum disulfide.

3. The metal-cored welding wire of claim 1, wherein the metal-cored welding wire comprises between 0.04% and 0.18% of the sulfur source by weight of the metal-cored welding wire.

4. The metal-cored welding wire of claim 3, wherein the granular core comprises between 0.2% and 1% of the sulfur source by weight of the granular core.

5. The metal-cored welding wire of claim 1, wherein the metal-cored welding wire comprises between 0.09% and 0.36% of the antimony source by weight of the metal-cored welding wire.

6. The metal-cored welding wire of claim 1, wherein the antimony source comprises antimony alloyed into the metallic sheath.

7. The metal-cored welding wire of claim 1, wherein the antimony source comprises antimony oxide disposed in the granular core.

8. The metal-cored welding wire of claim 1, wherein the metal-cored welding wire further comprises a cellulose source.

9. The metal-cored welding wire of claim 8, wherein the metal-cored welding wire comprises between 0.09% and 0.54% of the cellulose source by weight of the metal-cored welding wire.

10. The metal-cored welding wire of claim 8, wherein the cellulose source comprises sodium carboxymethyl cellulose.

11. The metal-cored welding wire of claim 1, wherein the metal-cored welding wire comprises between 0.25% and 0.75% nickel by weight of the metal-cored welding wire.

12. The metal-cored welding wire of claim 11, wherein the metal-cored welding wire comprises between 0.3% and 0.4% nickel by weight of the metal-cored welding wire.

13. The metal-cored welding wire of claim 1, wherein the granular core accounts for between 5% and 40% of the metal-cored welding wire by weight.

14. The metal-cored welding wire of claim 13, wherein the granular core accounts for between 10% and 20% of the metal-cored welding wire by weight.

15. The metal-cored welding wire of claim 13, wherein the granular core accounts for between 20% and 40% of the metal-cored welding wire by weight.

16. The metal-cored welding wire of claim 1, wherein the metal-cored welding wire is substantially free of indium.

17. The metal-cored welding wire of claim 1, wherein the carbon source comprises at least one of graphite or carbon black.

18. The metal-cored welding wire of claim 1, wherein the metal-cored welding wire further comprises manganese.

19. The metal-cored welding wire of claim 18, wherein the metal-cored welding wire comprises between 2% and 2.5% manganese by weight of the metal-colored welding wire.

20. A metal-cored welding wire, comprising a metallic sheath that encapsulates a granular core, wherein the metal-cored welding wire comprises by weight of the metal-cored welding wire:
    a sulfur source;
    an antimony source; and
    between 0.05% and 0.14% of a carbon source; and
    between 0.25% and 0.75% nickel;
    wherein the granular core accounts for between 20% and 40% of the metal-cored welding wire by weight.

21. The metal-cored welding wire of claim 20, wherein the metal-cored welding wire comprises by weight of the metal-cored welding wire at least 0.025% sulfur.

22. The metal-cored welding wire of claim 20, wherein the metal-cored welding wire comprises by weight of the metal-cored welding wire between 0.09% and 0.36% of the antimony source.

23. The metal-cored welding wire of claim 20, wherein the metal-cored welding wire further comprises by weight of the metal-cored welding wire between 0.12% and 1.5% silicon.

24. The metal-cored welding wire of claim 20, wherein the metal-cored welding wire further comprises by weight of the metal-cored welding wire between 2% and 2.5% manganese by weight of the metal-colored welding wire.

* * * * *